Patented Sept. 30, 1930

1,776,931

UNITED STATES PATENT OFFICE

LEO RUDOLF AND BODO ZSCHIMMER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

MANUFACTURE OF COLOR LAKES

No Drawing. Application filed July 16, 1926, Serial No. 123,029, and in Germany July 22, 1925.

We have found that valuable color lakes are obtained by the aid of the condensation products obtainable by the interaction of a halogen atom of an aromatic compound halogenated in the nucleus and containing nitro groups with the amino group of a primary or secondary aromatic amine, either free from or containing other substituents such as sulfonic or carboxylic acid groups, hydroxyl groups and the like. In case the said condensation products are insoluble pigments, they are intimately mixed with the usual lake components, but when they contain groups capable of forming salts, they are transformed into insoluble salts, especially barium- or calcium salts, as usual.

The new color lakes are distinguished by their excellent fastness to light, water and over-printing.

The following examples will further illustrate how our invention may be carried out in practice, but the invention is not limited to these examples. The parts are by weight.

Example 1

4 parts of the sodium salt of the condensation product of 2.4-dinitro-chlor-benzene and anthranilic acid having the formula:

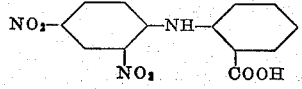

and 5 parts of soda-ash are dissolved in 500 parts of water; 20 parts of heavy spar and a solution of 10 parts of aluminium sulfate (containing 18 per cent of $Al_2O_3$) in 100 parts of water are added to this solution. The color lake is precipitated by adding at about 70° centigrade 16 parts of barium chlorid dissolved in 160 parts of water, and worked up in the usual manner.

The orange color lake so obtained is very fast to light, water and over-printing; more yellowish shades of equal fastness are obtained by employing smaller quantities of alkali than those indicated.

Example 2

20 parts of heavy spar are stirred into a solution of 10 parts of aluminium sulfate (containing 18 per cent of $Al_2O_3$) in 100 parts of water, whereupon 4 parts of the sodium salt of the condensation product of 2.4-dinitro-chlor-benzene and sulfanilic acid having the formula:

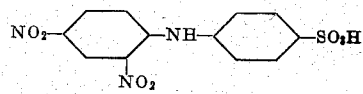

dissolved in 500 parts of water, 16 parts of barium chlorid dissolved in 160 parts of water and 3.5 parts of soda ash dissolved in 35 parts of water are added.

The color lake so prepared has a greenish yellow shade and is very fast to light, water and over-printing.

In the above examples the condensation products may be employed in the state of free acids instead of salts.

We claim:

1. As new articles of manufacture color lakes comprising an alkaline earth salt of a condensation product obtainable by the interaction of a halogen atom of an aromatic compound halogenated in the nucleus and containing nitro groups with the amino group of an aromatic amine, one of which components contains a carboxylic acid group.

2. As a new article of manufacture, the orange colour lake which is considered to be the barium salt, precipitated on a substratum, of the compound corresponding to the formula

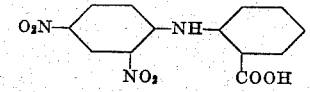

which lake is obtainable by mixing an alkaline aqueous solution of the sodium salt of said compound with heavy spar and aluminium sulphate in an aqueous medium and precipitating the lake by adding a barium chloride solution.

In testimony whereof we have hereunto set our hands.

LEO RUDOLF.
BODO ZSCHIMMER.